(12) United States Patent
Beitia et al.

(10) Patent No.: US 9,157,739 B1
(45) Date of Patent: Oct. 13, 2015

(54) FORCE-REBALANCE CORIOLIS VIBRATORY GYROSCOPE

(75) Inventors: Jose Beitia, Saint-Prix (FR); Isaak M. Okon, New York, NY (US); Dmitri V. Simonenko, Moscow (RU); Alain Renault, Pontoise (FR)

(73) Assignee: Innalabs Limited, Dublin (IE)

( * ) Notice: Subject to any disclaimer, the term of this patent is extended or adjusted under 35 U.S.C. 154(b) by 339 days.

(21) Appl. No.: 13/568,171

(22) Filed: Aug. 7, 2012

(51) Int. Cl.
*G01C 19/00* (2013.01)
*G01C 19/5677* (2012.01)
*G01C 25/00* (2006.01)

(52) U.S. Cl.
CPC ............ *G01C 19/5677* (2013.01); *G01C 25/00* (2013.01)

(58) Field of Classification Search
USPC ................... 73/1.37, 1.77, 504.13, 504.12
See application file for complete search history.

(56) References Cited

U.S. PATENT DOCUMENTS

| | | | |
|---|---|---|---|
| 5,886,257 A * | 3/1999 | Gustafson et al. ........... 73/178 R |
| 6,698,271 B1 * | 3/2004 | Fell et al. ........................ 73/1.37 |
| 7,526,957 B2 * | 5/2009 | Watson ....................... 73/504.13 |
| 7,617,727 B2 * | 11/2009 | Watson ....................... 73/504.13 |
| 7,739,896 B2 * | 6/2010 | Stewart .......................... 73/1.37 |
| 8,011,246 B2 * | 9/2011 | Stewart ...................... 73/504.13 |
| 8,763,441 B2 * | 7/2014 | Casinovi et al. ............... 73/1.77 |
| 2007/0039386 A1 * | 2/2007 | Stewart et al. ............. 73/504.14 |
| 2010/0063763 A1 * | 3/2010 | Rozelle ........................... 702/92 |

* cited by examiner

*Primary Examiner* — Hezron E Williams
*Assistant Examiner* — Xin Zhong
(74) *Attorney, Agent, or Firm* — Bardmesser Law Group

(57) ABSTRACT

An effective and precise method and system for compensation and measurement of a zero-bias in an axisymmetrical CVG (Coriolis Vibrating Gyroscope) is provided. Principal mode is driven according to an X-axis. Angular velocity is measured through Coriolis mode excitation along Y-axis. The sensitive axis of the gyroscope is reversed by 180 degrees by switching input and sense signals. Vibration is then driven along Y-axis and angular velocity is sensed along X-axis. On each position, after an arbitrary period of time, the gyroscope output is stored. Half-difference in outputs between two opposite position gives angular velocity and zero-bias effect is canceled. Half-sum in outputs between two opposite position gives the zero-bias error.

13 Claims, 8 Drawing Sheets

FORCE-REBALANCE CORIOLIS VIBRATORY GYROSCOPE

BACKGROUND OF THE INVENTION

1. Field of the Invention

The present invention is related to a Force-Rebalance Coriolis Vibrating Gyroscope (CVG), and more particularly, to an axisymmetrical gyroscope such as a ring, a cylindrical, a hemispherical, or tuning forks gyroscopes.

2. Description of the Related Art

A gyroscope is a device for measuring or maintaining orientation. Applications of gyroscopes include inertial navigation (INS), stabilization of ground vehicles, aircraft, ships, and line of sights, piloting etc. . . . .

Conventional vibrating gyroscopes are disclosed in the following U.S.

Patents: U.S. Pat. No. 6,698,271, U.S. Pat. No. 7,120,548, U.S. Pat. No. 7,240,533, U.S. Pat. No. 7,216,525, U.S. Pat. No. 7,281,425, U.S. Pat. No. 5,597,955. Vibrating gyroscopes (i.e., gyroscopes based on vibrating structures) have many advantages over traditional spinning gyroscopes (i.e., based on a rapidly spinning mass), but also over gyroscopes based on fiber-optic or laser technologies.

Vibrating gyroscopes have a stronger structure with lower power consumption than conventional gyroscopes. They are made of only few parts, more or less near 5, whereas conventional gyroscopes have more than 20 parts. Consequently, they are cheaper and can be mass produced. Some of them belong to the Micro Electro Mechanical Sensors (MEMS) technology, and size of less than 1 mm is currently achieved. Unfortunately, reduction in size does not mean improvement in performance. However, this MEMS gyros lead to integrated and cheaper systems as required for instance for automotive market and consumer electronics.

A variety of geometries of vibrating structures can be used for manufacturing sensitive elements of vibrating gyroscopes. For example, rings, tuning forks, beams, thin-walled cylinders and hemispheres are used in vibrating gyroscopes. These vibrating structures can be made out of different materials: metal, piezoelectric ceramics, fused quartz (fused silica), thin-film silicon layers, etc.

Top of the range performances are observed on gyroscopes based on high-Q resonators with strict axial symmetry. Typical shapes are ring, hemisphere and cylinder, and vibration modes used are typically the second order vibrations (often named $\cos(2\theta)$ and $\sin(2\theta)$ vibrations). Achievements based on all those ring-like resonators are much easier when considering a second order vibration, but other vibration orders could be available.

In case of an axisymmetrical double tuning forks such as described in U.S. Pat. No. 5,597,955, vibration mode order is 1 instead of 2.

In any case, axis of sensitivity of these gyroscopes is their axis of symmetry (i.e., the whole resonator shape can be created by rotating a partial shape around a straight line named axis of symmetry). Typically, this axis is denoted as Z-axis.

In the particular case of ring-like vibrating gyroscopes and second order vibration mode, fluctuations occur in such a way that the resonator is stretched into an ellipse along its X-axis during the first oscillations half-cycle and along the axis perpendicular to the X-axis in the second oscillation half-cycle (see FIG. 1A). In the course of these oscillations a standing wave vibrates inside the ring. The standing wave is characterized by four anti-nodes and nodes, distributed in a circular profile of the resonator at equal positions separated by 45 degrees angles.

The nodes and the anti-nodes are located in an alternate order, so a node is located between two anti-nodes, and the anti-node is located between the two nodes. In case of power balancing waves (i.e., a force-rebalance mode), an elastic wave is excited at the second vibration mode of the resonator with a given amplitude and the elastic wave is stabilized by an AGC system (Automatic Gain Control).

In the particular case of an axisymmetrical double tuning fork and first order vibration, beams are stretched through a bending mode and physical angle between X-axis and Y-axis is 90 degrees.

Whatever the axisymmetrical gyroscope, ring-like or double tuning fork as previously mentioned, the rotation around the sensitive axis creates Coriolis' forces:

$$\vec{F}c = 2m[\vec{\Omega} \wedge \vec{v}]$$

where $\vec{F}c$ is a vector of the Coriolis force, m is a vibrating mass, $\vec{\Omega}$ is a velocity of rotation of the resonator around its axis of symmetry, and $\vec{v}$ is a linear velocity vector of the structural elements in the process of vibration, the symbol "$\wedge$" denotes vector product.

Effect of Coriolis forces is to create Coriolis measured mode of (i.e., sense mode) oscillations. Amplitude of these oscillations is proportional to the angular velocity in $|\vec{\Omega}|$ of rotation. The Coriolis mode is oriented along the Y-axis when the excited mode (i.e., drive mode) is oriented along the X-axis.

In case of ring-like resonators, Coriolis mode nodes are located at the anti-nodes of the excited mode, and Coriolis mode anti-nodes are located at the nodes of the excited mode. Spatially, these two modes are rotated by an angle of 45 degrees to each other (see FIG. 1B).

The simplest way to operate theses modes is named "the force-rebalance mode". A description is given in IEEE 1431. The drive mode is controlled with a constant amplitude and the Coriolis mode is controlled through a closed loop which parameters are the quadrature signal and angular inertial velocity $|\vec{\Omega}|$ Source of the quadrature is the mismatch in the two modes frequencies. The mismatch in frequencies is important because this leads to drift errors and poor performances.

Because of symmetry, axisymmetrical resonators' mismatch in frequencies and damping are theoretically zero. However, all gyroscopes described in the above patents have some imperfections due to material inhomogeneities, due to machining imprecision, but also due to drive and sense elements misplacements.

All these errors are responsible of mismatch in frequencies, damping and mismatch in damping. Thus, a significant zero-bias error appears which depends on temperature and time.

Conventional methods of compensation for dependency of the zero-bias on temperature use calibration, as disclosed in U.S. Pat. No. 7,120,548 and U.S. Pat. No. 7,240,533.

This process of calibration is time consuming and expensive. Additionally, materials ages and their properties change over time. As a result, conventional calibrations are not robust and effective. Other methods of compensation for zero-bias use internal signals of wave control system to compensate for the initial offset (U.S. Pat. No. 6,698,271). However, this method compensates only one source of error and does not compensate for other sources, such as effect of mismatch in damping and frequencies.

Accordingly, there is a need in the related art for a cost-effective and precise method for compensation of a zero-bias in a gyroscope.

SUMMARY OF THE INVENTION

The present invention is related to a Coriolis Vibrating Gyroscope (CVG), and more particularly, to a gyroscope, working in the compensation mode (i.e., force-rebalance mode) that substantially obviates one or several of the disadvantages of the related art. This gyroscope is preferably based on an axisymmetrical resonator. In case of a ring-like resonator, though not exclusively, the resonator is driven and controlled through its two second order vibration modes (elliptical shape). In case of a double tuning fork as previously mentioned, the resonator is driven and controlled through its first order vibration modes (for example, bending of beams).

In one aspect of the present invention the excitation of the vibration mode along the X-axis is performed. The angular velocity is measured by measuring the amplitude of the Coriolis mode along the Y-axis.

After a determinate time period T, the excitation signal is fed to the electrode mounted along the Y-axis and is measured along the X-axis. Consequently, the sensitive axis of the gyroscope is reversed by 180 degrees.

Then, errors in the gyroscope due to zero-bias and its changes based on time and the temperature can be cancelled when considering half-difference of measurements obtained on X and Y positions of the wave.

In this case, the error caused by inhomogeneities of the resonator can be averaged out, because this error is periodic over a round. Note that when switching the excitation signal from one electrode to another, there is a transition process, during which the measurement of the angular velocity is still possible, but with a decrease in accuracy.

To measure with high accuracy the angular velocity in the time interval when the gyroscope is in a transition process the second additional coaxial gyroscope is used and can work on a similar scheme based on switching signal stimulation. In case of these two gyroscopes, a continuous measurement of angular velocity is provided. Time shift period is preferably T. When one of the gyroscopes is in a transitional phase, the measurements are performed by another gyroscope functioning in a steady-state mode, and vice versa.

In case of ring-like gyroscopes, 4 pairs of electrodes (or actuators and sensor elements) are usually used to drive and sense vibration modes. One pair is used to drive the vibration along X-axis, one pair is used to sense the vibration along X-axis, angular position between drive and sense electrodes for X-axis being 90 degrees. Electrode system for Y-axis is obtained by rotating electrodes system for X-axis by 45 degrees. Because of symmetry, choice for X-axis and correspondent electrodes is free. Theoretically, there are 4 different possibilities to choose electrodes for X-axis. In any case, the present invention does not depend on the choice of electrodes system. Similar considerations could be stated in case of axisymmetrical double tuning forks.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings:

FIGS. 1A and 1B illustrate conventional axisymmetrical gyroscopes. FIG. 1A includes location of nodes and antinodes of the standing wave created by the vibrations of the resonator when the angular velocity is absent; FIG. 1B shows two modes of vibration of the resonator: X-axis mode of excitation (i.e., drive mode) to Y-axis measured mode (i.e., sense mode);

DETAILED DESCRIPTION OF THE PREFERRED EMBODIMENTS

Reference will now be made in detail to the preferred embodiments of the present invention, examples of which are illustrated in the accompanying drawings.

An effective and more precise method and system for compensation of a zero-bias in a gyroscope is provided. An excitation of vibration mode along the X-axis is performed. The angular velocity is measured by measuring the amplitude of the Coriolis mode along the Y-axis. The sensitivity axis of the gyroscope is reversed by 180 degrees by reversing electrodes acting on X-axis and Y-axis.

The excitation signal is fed to the electrode mounted along the X-axis and is measured along the Y-axis. After a time period T, the excitation signal is fed to the electrode mounted along the Y-axis and is measured along the X-axis. Thus, the position of a standing wave is alternately changed. The sign of the measured angular velocity of the output signal of the gyroscope changes as well.

According to an exemplary embodiment in the stable position of gyro, errors in the gyroscope due to zero-bias and its changes based on time and the temperature are canceled by calculating half-difference of measurements obtained through X and Y positions of the wave.

Typically, but not exclusively, the excitation is switched by software in a processor (e.g., DSP) and compensated output can also be calculated using the DSP.

Figure 1A:
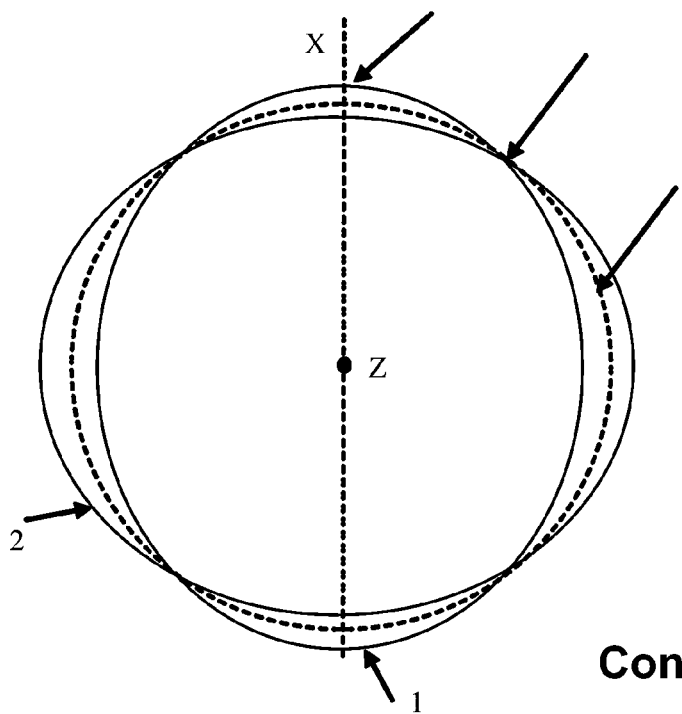
Figure 1B:
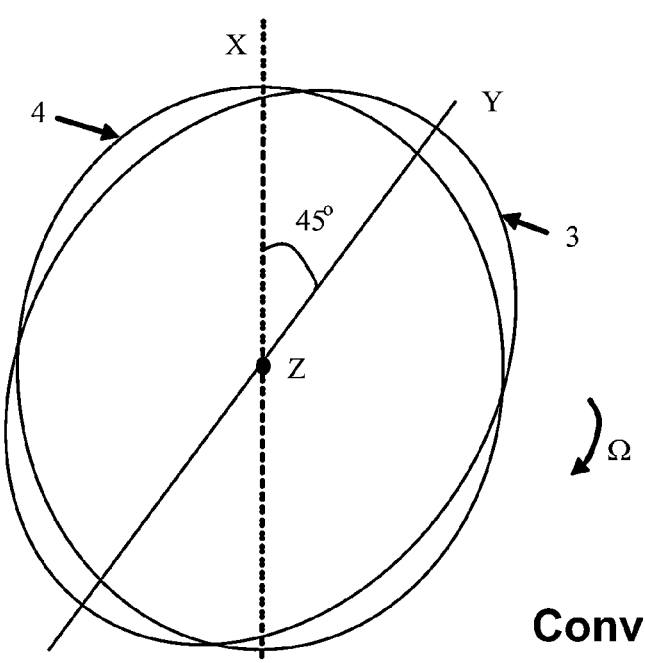
Figure 2:
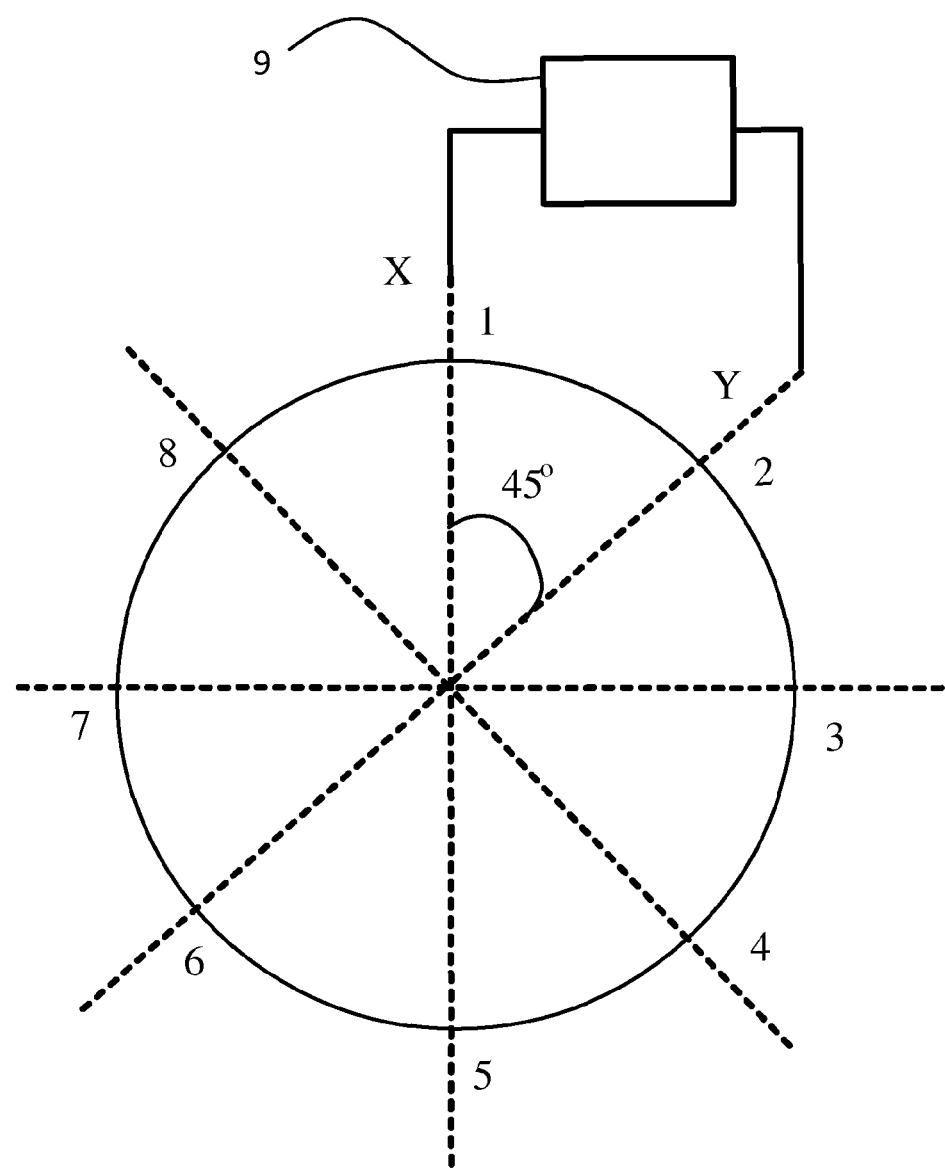
FIG. 2 illustrates a gyroscope with electrodes location, in accordance with the exemplary embodiment.
Figure 8:
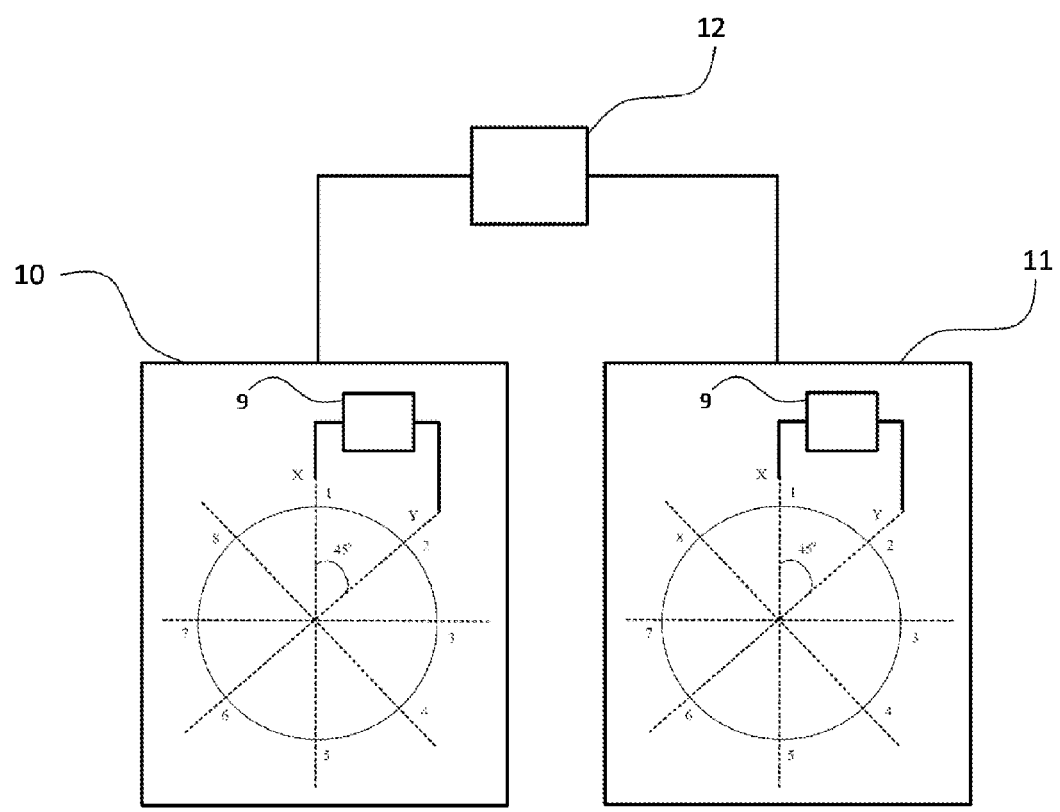
FIG. 8 shows the embodiment with multiple gyroscopes.

FIG. 2, as an example of an axisymmetrical ring-like resonator driven on its second order modes, illustrates a resonator with eight electrodes in accordance with the exemplary embodiment. The electrodes are fed with excitation signals and the output signals are taken off for measurement of angular velocity. In one embodiment, the logic of switching signal excitation consists of the following. The excitation signal on the X-axis is switched (see element 9, which can be a hard-wired switch or a microprocessor) after a time interval T to electrode 2, and the signal measuring the angular velocity from the electrode 2 on the Y-axis is switched to electrode 1, Generally, applications which require accurate gyroscopes allow selecting large range of values of T interval. Moreover, the T interval also depends on stochastic characteristics of the gyroscope. FIG. 8 shows a similar embodiment but with multiple gyroscopes (10, 11) and the switch 12.

Considering basic equations governing the wave pattern behavior, and without a loss of generality, damping effect and mismatch in frequencies can be neglected. Consider X-axis as the direction of the drive mode, and Y-axis as the direction of the sense mode (Coriolis):

$$\begin{cases} \ddot{x} - 2k\Omega\dot{y} + \omega^2 x = f_x \\ \ddot{y} + 2k\Omega\dot{x} + \omega^2 y = f_y \end{cases} \quad (1)$$

Where:

$\omega$—is the natural frequency of vibration of the resonator along X and Y axis, respectively;

k—Coriolis coupling coefficient, equal to 1 in case of beams, 0.8 in case of a ring and 0.55 in case of a hemispherical resonator;

$\Omega$—measured angular velocity;

$f_x$, $f_y$—forces applied along the X and the Y-axis in order to control the vibration.

The dots above the letter in equations (1) denote the time derivatives.

Assuming SF is the scale factor of the gyroscope, $U_y$, its output, and B the zero-bias, the following equation gives the force-rebalanced model:

$$U_y \times SF = \Omega + B \quad (2)$$

By using some conventional electronics means able to switch channels from one to the other, we can assume the vibration is now driven along Y-axis (FIG. 2). Coriolis forces should be sensed along X-axis. Taking into account equation (1), this leads to the following equations:

x to y and y to x $$\begin{cases} \ddot{y} - 2k(-\Omega)\dot{x} + \omega^2 y = f_y \\ \ddot{x} + 2k(-\Omega)\dot{y} + \omega^2 x = f_x \end{cases} \quad (3)$$

As seen from the above equation, the sign (i.e., directions) of the angular velocity has changed. In other words, when excitation is along Y-axis and reading is along X-axis, angular velocity is measured with the opposite sign. The force-rebalanced model becomes:

$$U_x \times SF = -\Omega + B \quad (4)$$

The formulas (3) and (4) suppose the stable position of gyro when $\Omega$=Constant when the gyroscopes are in the stable position in start time in the production place or in the field without any equipment or when in the some application the changing in the inertial angle velocity can be neglected according to required accuracy during the small period T of switching electrodes Where $U_x$ is the output signal when the device is being driven along the Y-axis.

A half-difference of measurements performed in time intervals T in the first and second cases gives angular velocity:

$$\Omega = \left(\frac{U_y - U_x}{2}\right) \times SF \quad (5)$$

Figure 5:
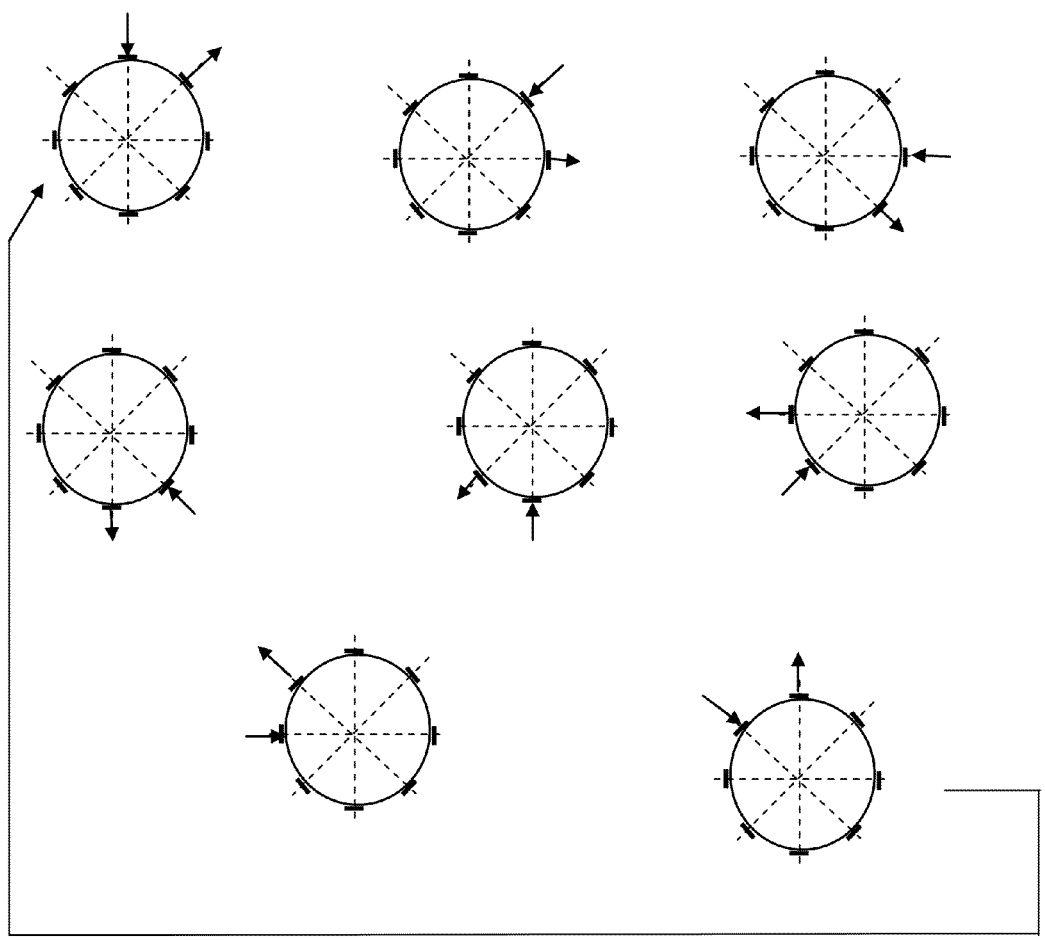
FIG. 5 illustrates a scheme for switching the excitation, in accordance with the exemplary embodiment.

Thus, the calculated half-difference of measurements of the proposed gyroscope eliminates the zero-bias, and the angular velocity is calculated in its pure form. This result does not depend on the X-axis vibration position and any other position could be chosen to give the same result (FIG. 5).

Half-sum of measurements performed in time intervals T in the first and second cases gives an output bias:

$$B = \left(\frac{U_y + U_x}{2}\right) \times SF \quad (6)$$

The calculation of inertial angle velocity $\Omega$ and Bias B according to equations (5) and (6) as it is mentioned above assumes that both values are not changing in the time period T of the switching.

In the general case also, the gain factors of piezo elements—vibrators and sensors—are different. This leads to a difference in the Scale Factors (SFs) in the different position of switching electrodes.

Let $SF_1$ be a scale factor in the position $\theta=0$ when the excitation signal is fed to the electrode mounted along the X-axis and is measured along the Y-axis:

$$SF1 = d1 * m2 \quad (7)$$

and $SF_2$ is scale factor after the switching electrodes 1 and 2 after time period T when the excitation signal is fed to the electrode mounted along the Y-axis and is measured along the X-axis:

$$SF2 = d2 * m1 \quad (8)$$

where $d_1$ and $d_2$ are gain factors of vibrators and $m_1$, $m_2$ are gain factors of sensors electrode 1 and electrode 2 respectively.

For achieving equality of $SF_1$ and $SF_2$, after switching electrodes it is proposed to multiply the input signal of Electrode 2 by the coefficient $K_{12}=d_1/d_2$ and the output of this electrode is multiplied by the factor of $K_{22}=m_1/m_2$. Thus, $SF_2$ will be equal to $SF_1$. Similarly, to equalize all SFs in the switching process it is proposed to add the Multiplier $K_{1i}$, to the inputs of electrodes in the period of calibration:

$$K1i = d1/di \quad (9)$$

and multiplier $K_2$, to the output of electrodes $$K2i = m1/mi \quad (10)$$

where i corresponds to gain factors of electrodes i=2-7.

Thus, in the beginning in the process of calibrating, equality parameters of all Electrodes and correspondently Scale Factors of the measuring inertial angle velocity $\Omega$ can be achieved in all positions of excitation, and signals can be measured after switching electrodes.

As is known in the art, bias takes the form of a sin(2θ) function. By choosing several positions of the X-axis vibration (FIG. 5), the method described above allows to identify the entire function B(θ). This result is used to identify bias errors of a gyroscope.

Figure 3:
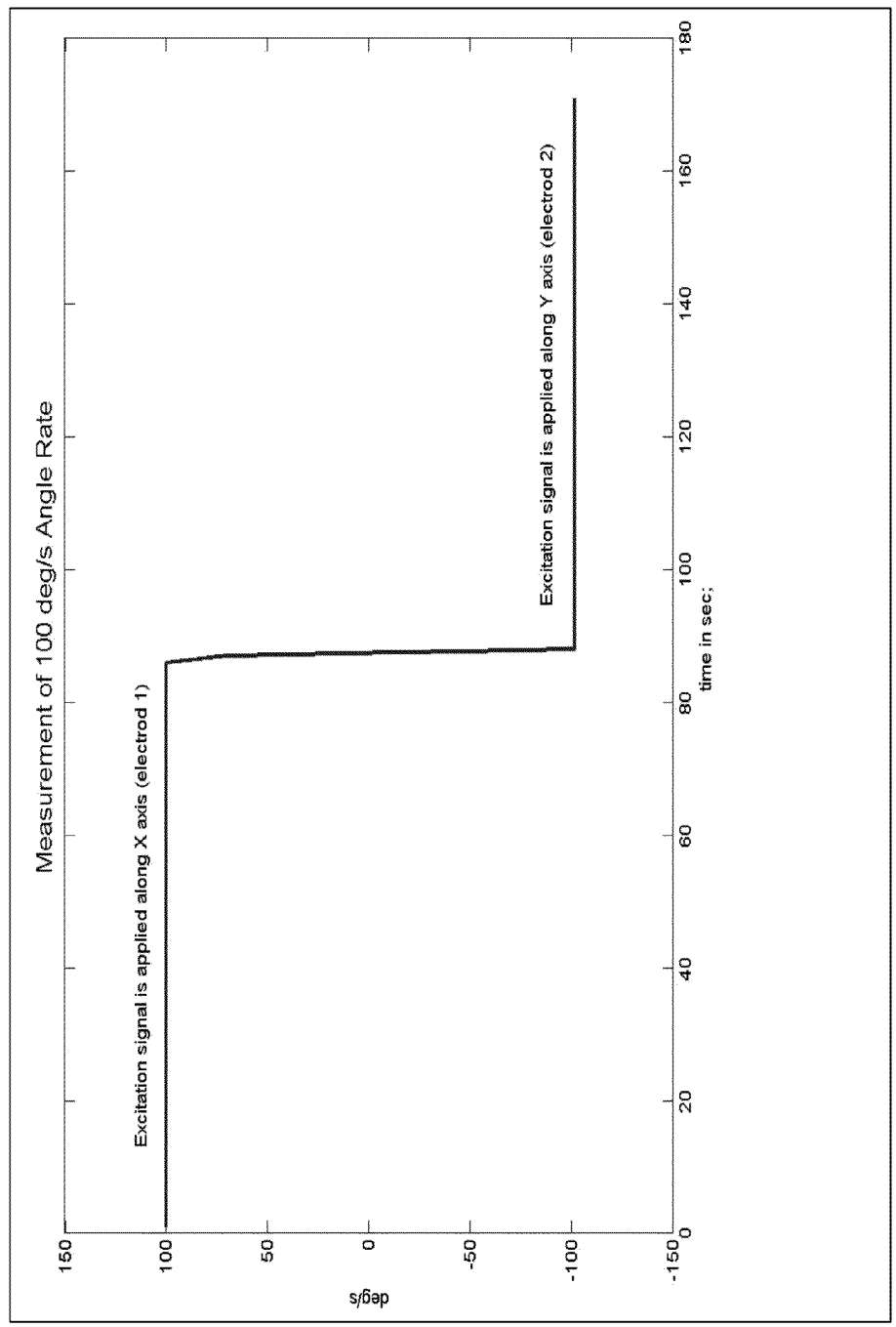
FIG. 3 illustrates an exemplary graph depicting measurements of the angular velocity.

FIG. 3 illustrates an exemplary graph depicting measurements of the angular velocity of 100 degrees per second rate performed by the gyroscope employing switching of the excitation signal from the electrode 1 to electrode 2. The transition process is excluded from the measurements. As seen from the graph depicted in FIG. 3, switching of excitation signal results in changing of the sign (i.e., direction) of the angular velocity to the opposite sign.

Figure 4:
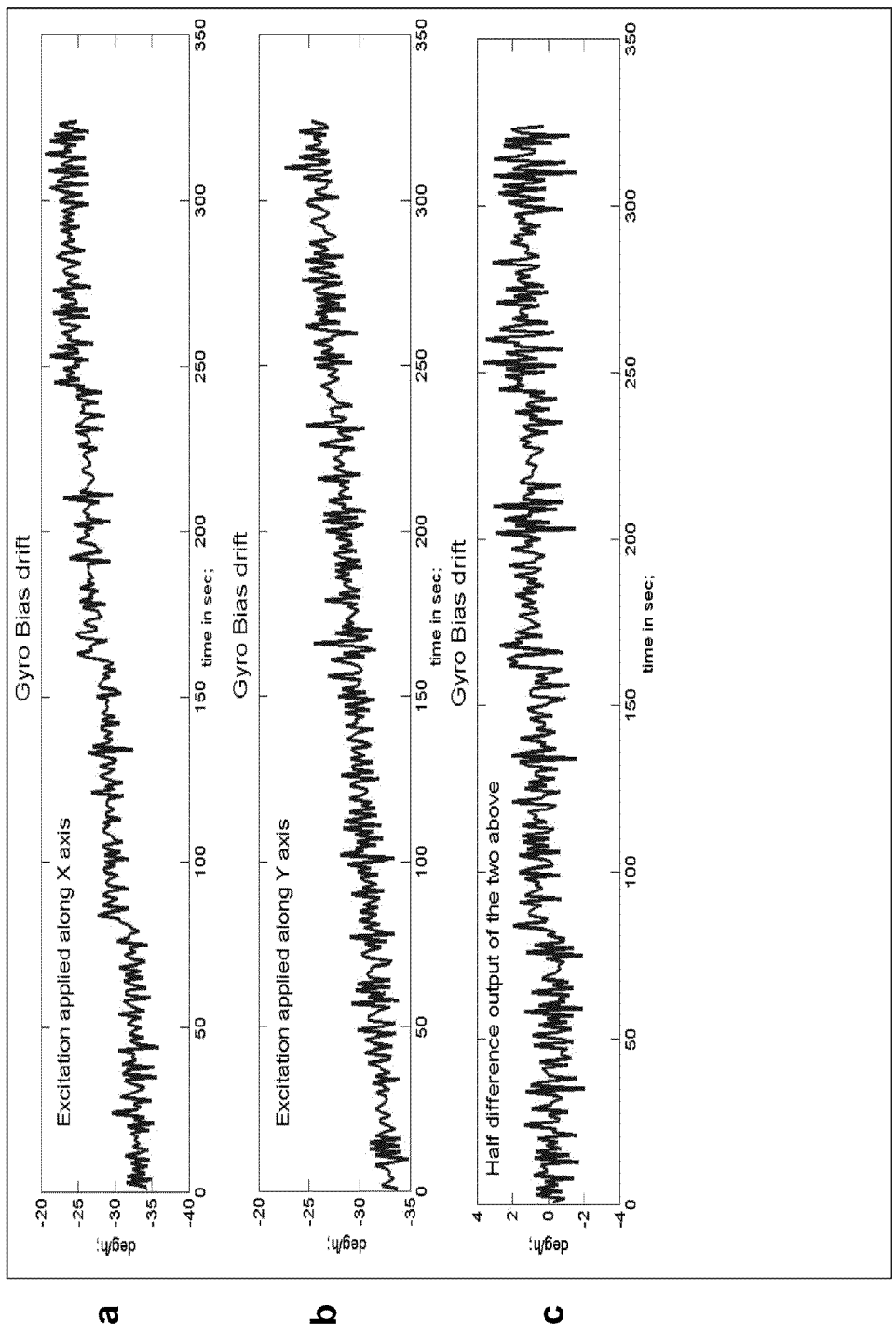
FIG. 4 illustrates exemplary graphs of static measurements, when the measured angular velocity equals to zero.

FIG. 4 illustrates static measurements, when the measured angular velocity equals to zero. This illustrates that the measured zero-bias (vertical component of the angular velocity of the Earth was excluded from measurements) varies based on time and temperature changes (as a result of self heating), but zero-bias in the measurement signal from the electrode 1 and 2 (graphs (a) and (b)) vary identically.

Consequently, the graph of half-difference of measurements (graph (c)) illustrates a compensation of zero-bias. Thus, according to the proposed method of measuring the angular velocity, the angular velocity is measured with a substantial compensation of zero-offset as well as with compensation of its variation based on temperature and time.

As discussed above, in order to carry out accurate measurements in the intervals when the gyroscope is in a transition phase, a second coaxial gyroscope is used. The excitation signal in the second gyroscope is switched during the intervals when the first gyroscope measures the angular velocity. Thus, use of two coaxial gyroscopes operating under the same scheme with a switching excitation signal with a similar period T provides a continuous measurement of the angular velocity. When one of the gyroscopes is in a transitional mode, the measurements are performed by the other gyroscope functioning in a steady mode.

This idea can be easily extended to two or three axes gyroscope units.

Figure 6:
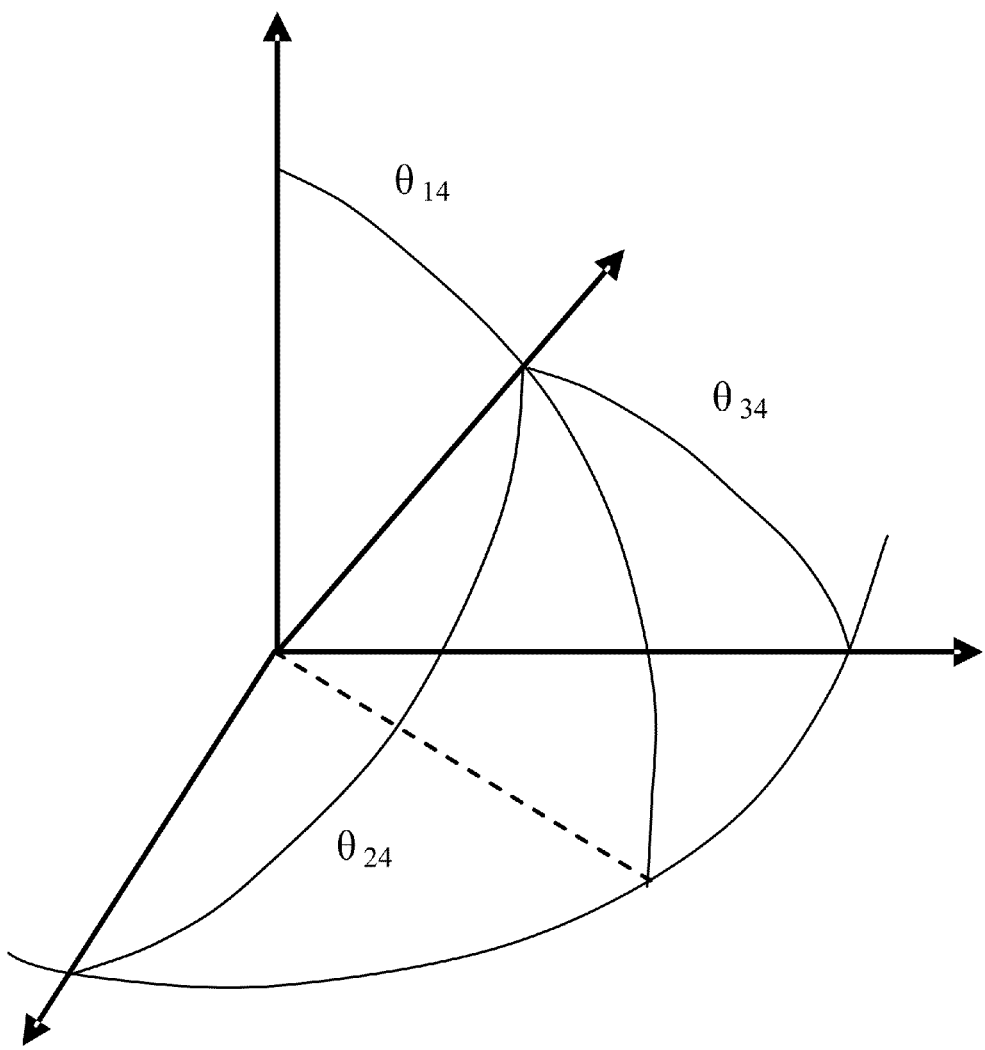
FIG. 6 illustrates a three-axes system, in accordance with the exemplary embodiment.

In case of three axes unit (IMU, Inertial Measurement Unit), 4 gyroscopes with changeable excitation axis can be preferably used instead of three pairs of gyroscopes. In order to measure the angular velocity in the time interval when at least one of three gyroscopes is in the transitional phase, one additional gyroscope has to be preferably used. The sensitive axis of this gyroscope should be located at an angle not equal to 90 degrees with each of the three gyroscopes, as shown in FIG. 6. Several possibilities can be contemplated. In case 3, the gyroscopes have their sensitive axis along an orthogonal reference frame, and an additional 4th gyroscope can be oriented with 45 degrees with each of the other gyroscopes axis. Then, compensated output shall take into account a correction factor: a signal provided by the additional 4-th gyroscope has to be multiplied by the cosine of the angle between the sensitive axis of the 4-th gyroscope and a corresponding sensitive axis of each of the three other gyroscopes.

Figure 7:
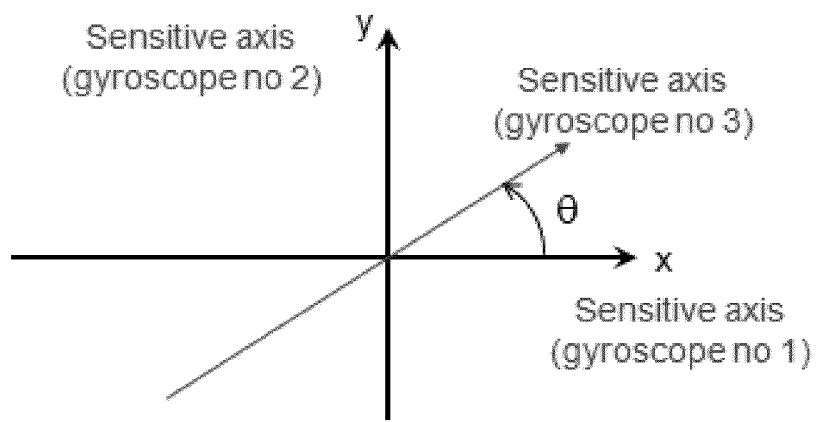
FIG. 7 illustrates a two-axis system, in accordance with the exemplary embodiment.

Similar ideas can be stated in case of two axes units. A third gyroscope with sensitive axis located not necessarily in the plane defined by the two other gyroscopes can be used, angle between its sensitive axis and other gyroscope sensitive axis being different from 90 degrees (FIG. 7).

Having thus described a preferred embodiment, it should be apparent to those skilled in the art that certain advantages of the described method and apparatus have been achieved. In particular, those skilled in the art would appreciate that the proposed system and method provide for effective zero-bias compensation and its drift based on temperature and time effects.

It should also be appreciated that various modifications, adaptations and alternative embodiments thereof may be made within the scope and spirit of the present invention. The invention is further defined by the following claims.

What is claimed is:

1. An axisymmetrical Coriolis Vibrating Gyroscope (CVG) system, comprising:
   a first gyroscope having an axisymmetrical resonator;
   a plurality of actuators mounted on the resonator to drive first and second vibration modes, the second vibration mode being sensitive to Coriolis forces,
   wherein the second vibration mode is offset from the first vibration mode by 45°;
   a plurality of sensor elements mounted on the resonator to sense the first vibration mode and the second vibration mode; and
   a second gyroscope with a coaxial sensitive axis and configured to provide a measurement of angular velocity while the first gyroscope is in a transition phase,
   wherein an excitation signal is alternately used to drive the first vibration mode and to drive an excitation of the second vibration mode over a period of time; and
   a switch configured to change a sign of the measured angular velocity when the excitation of the first vibration mode changes to the excitation of the second vibration mode, and an orientation of a sensitive axis of the CVG rotates by 180 degrees when comparing an orientation of the sensitive axis when the excitation of the first vibration mode changes to the excitation of the second vibration mode; and
   wherein the switch is configured so that a sign of a zero-bias output of the CVG does not change when the excitation of the first vibration mode changes to the excitation of the second vibration mode,
   wherein the switch configures the gyroscopes to have a time interval of the transition for the first gyroscope to be the same as a time interval of the transition of the second gyroscope,
   wherein bias errors of the first gyroscope are eliminated over an entire range of θ representing angular orientation of a vibration axis of the first vibration mode relative to an axis for excitation of a first electrode of the first gyroscope, and
   wherein the switch is configured so that scale factors of the first gyroscope when exciting the first and second vibration modes are calibrated to be equivalent.

2. The CVG system of claim 1, wherein the second gyroscope operates on a Coriolis force principle.

3. The CVG system of claim 1, wherein the resonator is hemispherical.

4. The CVG system of claim 1, wherein the resonator is cylindrical.

5. The CVG system of claim 1, wherein the resonator is a double tuning fork.

6. The CVG system of claim 1, wherein the resonator is a ring-like resonator.

7. An axisymmetrical Coriolis Vibrating Gyroscope (CVG) system, comprising:
   a first gyroscope having an axisymmetrical resonator;
   a plurality of actuators mounted on the resonator to drive the first and second vibration modes, the second vibration mode being sensitive to Coriolis forces,
   wherein the second vibration mode is offset from the first vibration mode by 45°;
   a plurality of sensor elements mounted on the resonator to sense the first and second vibration modes; and
   a second gyroscope with a coaxial sensitive axis and configured to provide a measurement of angular velocity while the first gyroscope is in a transition phase, wherein an excitation signal is alternately used to drive the first vibration mode and to drive an excitation of the second vibration mode over a period of time, wherein a switch is configured so that a compensated angular velocity, with a zero-bias error canceled, is calculated based on a half difference of outputs for the driven first vibration mode and for the driven second vibration mode when the gyroscopes are in a stable state at start time, and neglecting a change in an inertial angle velocity during a switching of the electrodes, wherein the switch configures the gyroscopes to have a time interval of the transition for the first gyroscope to be the same as a time interval of the transition of the second gyroscope, wherein bias errors of the first gyroscope are eliminated over an entire range of θ representing angular orientation of a vibration axis of the first vibration mode relative to an axis for excitation of a first electrode of the first gyroscope, and wherein the switch is configured so that scale factors of the first gyroscope when exciting the first and second vibration modes are calibrated to be equivalent.

8. An axisymmetrical Coriolis Vibrating Gyroscope (CVG) system, comprising:

a first gyroscope having an axisymmetrical resonator;

a plurality of actuators mounted on the resonator to drive a first vibration mode and second vibration modes, the second vibration mode being sensitive to Coriolis forces, wherein the second vibration mode is offset from the first vibration mode by 45°;

a plurality of sensor elements mounted on the resonator to sense the first and second vibration modes; and a second gyroscope with a coaxial sensitive axis and configured to provide a measurement of angular velocity while the first gyroscope is in a transition phase, wherein an excitation signal is alternately used to drive the first vibration mode and to drive an excitation of the second vibration mode over a period of time, wherein:

a switch is configured so that the first mode is controlled so that a position of a wave inside a reference frame attached to the resonator takes any value between 0 and 360 degrees, and wherein when the position of the wave is chosen, the first mode's orientation defines an X-axis, and a Coriolis force axis is perpendicular to the X-axis for a first order vibration mode, and is at 45 degrees to the X-axis for a second order vibration mode, wherein the switch configures the gyroscopes to have a time interval of the transition for the first gyroscope to be the same as a time interval of the transition of the second gyroscope, wherein bias errors of the first gyroscope are eliminated over an entire range of θ representing angular orientation of a vibration axis of the first vibration mode relative to an axis for excitation of a first electrode of the first gyroscope, and wherein the switch is configured so that scale factors of the first gyroscope when exciting the first and second vibration modes are calibrated to be equivalent.

9. The CVG system of claim 8, wherein the zero-bias error is calculated as half-sum of reversed driven modes for any position of the first mode vibration inside the resonator's reference frame.

10. An axisymmetrical Coriolis Vibrating Gyroscope (CVG) system, comprising:

a first gyroscope, a second gyroscope, and a third gyroscope;

each of the first, second and third gyroscopes having a ring-like resonator;

each of the first, second and third gyroscopes having a plurality of actuators mounted on the resonator to drive first and second vibration modes, the second vibration mode being sensitive to Coriolis forces, wherein the second vibration mode is offset from the first vibration mode by 45°;

each of the first, second and third gyroscopes having a plurality of sensor elements mounted on the resonator to sense a first vibration mode and a second vibration mode; and wherein an excitation signal is alternately used to drive the first vibration mode and to drive an excitation of the second vibration mode over a period of time;

wherein the first, second and third gyroscopes are mutually orthogonal;

an additional gyroscope having its sensitive axis located at an angle that is not equal to 90 degrees with any of the first, second and third gyroscopes, wherein projections from an output the additional gyroscope are used as substitutes for outputs of the first, second and third gyroscopes during their transition processes, and further comprising:

a switch configured to change a sign of the measured angular velocity when the excitation of the first vibration mode changes to the excitation of the second vibration mode, and an orientation of a sensitive axis of the CVG rotates by 180 degrees when comparing an orientation of the sensitive axis when the excitation of the first vibration mode changes to the excitation of the second vibration mode; and wherein the switch is configured so that a sign of a zero-bias output of the CVG does not change when the excitation of the first vibration mode changes to the excitation of the second vibration mode, wherein the switch configures the first and second gyroscopes to have a time interval of the transition for the first gyroscope to be the same as a time interval of the transition of the second gyroscope, wherein bias errors of the first gyroscope are eliminated over an entire range of θ representing angular orientation of a vibration axis of the first vibration mode relative to an axis for excitation of a first electrode of the first gyroscope, and wherein the switch is configured so that scale factors of the first gyroscope when exciting the first and second vibration modes are calibrated to be equivalent.

11. An axisymmetrical Coriolis Vibrating Gyroscope (CVG) system, comprising:

a first gyroscope, a second gyroscope, and a third gyroscope;

each of the first, second and third gyroscopes having an axisymmetric resonator;

each of the first, second and third gyroscopes having a plurality of actuators mounted on the resonator to drive first and second vibration modes, the second vibration mode being sensitive to Coriolis forces, wherein the second vibration mode is offset from the first vibration mode by 45°;

each of the first, second and third gyroscopes having a plurality of sensor elements mounted on the resonator to sense the first and second vibration modes; and wherein an excitation signal is alternately used to drive the first vibration mode and to drive an excitation of the second vibration mode over a period of time;

wherein the first, second and third gyroscopes are mutually orthogonal;

an additional gyroscope having its sensitive axis located at an angle that is not equal to 90 degrees with any of the first, second and third gyroscopes, wherein projections from an output the additional gyroscope are used as substitutes for outputs of the first, second and third gyroscopes during their transition processes, wherein:

an orientation of the sensitive axes of each of the first, second and third gyroscopes rotates by 180 degrees when comparing an orientation of the sensitive axis when the first vibration mode is driven vs. when the second vibration mode is driven; and a switch is configured so that a sign of the measured angular velocity changes due to switching between the excitation of the first mode and the excitation of the second mode, wherein the switch configures the first and second gyroscopes to have a time interval of the transition for the first gyroscope to be the same as a time interval of the transition of the second gyroscope, wherein bias errors of the first gyroscope are eliminated over an entire range of θ representing angular orientation of a vibration axis of the first vibration mode relative to an axis for excitation of a first electrode of the first gyroscope, and wherein the switch is configured so that scale factors of the first gyroscope when exciting the first and second vibration modes are calibrated to be equivalent.

12. An axisymmetrical Coriolis Vibrating Gyroscope (CVG) system, comprising:

a first gyroscope and a second gyroscope;

each of the first and second gyroscopes having a ring-like resonator;

each of the first and second gyroscopes having a plurality of actuators mounted on the resonator to drive first and second vibration modes, the second vibration modes being sensitive to Coriolis forces, wherein the second vibration mode is offset from the first vibration mode by 45°;

each of the first and second gyroscopes having a plurality of sensor elements mounted on the resonator to sense a first vibration mode and a second vibration mode; and wherein an excitation signal is alternately used to drive the first vibration mode and to drive an excitation of the second vibration mode over a period of time;

wherein the first and second gyroscopes are mutually orthogonal;

an additional gyroscope having its sensitive axis located at an angle that is not equal to 90 degrees with the first and second gyroscopes, wherein projections from an output the additional gyroscope are used as substitutes for outputs of the first and second gyroscopes during their transition processes, and further comprising:

a microprocessor configured to change a sign of the measured angular velocity when the excitation of the first vibration mode changes to the excitation of the second vibration mode, and an orientation of a sensitive axis of the CVG rotates by 180 degrees when comparing an orientation of the sensitive axis when the excitation of the first vibration mode changes to the excitation of the second vibration mode; and wherein the microprocessor is configured so that a sign of a zero-bias output of the CVG does not change when the excitation of the first vibration mode changes to the excitation of the second vibration mode, wherein the microprocessor configures the first and second gyroscopes to have a time interval of the transition for the first gyroscope to be the same as a time interval of the transition of the second gyroscope, wherein bias errors of the first gyroscope are eliminated over an entire range of θ representing angular orientation of a vibration axis of the first vibration mode relative to an axis for excitation of a first electrode of the first gyroscope, and wherein the microprocessor is configured so that scale factors of the first gyroscope when exciting the first and second vibration modes are calibrated to be equivalent.

13. An axisymmetrical Coriolis Vibrating Gyroscope (CVG) system, comprising:

a first gyroscope and a second gyroscope;

each of the first and second gyroscopes having an axisymmetric resonator;

each of the first and second gyroscopes having a plurality of actuators mounted on the resonator to drive a first vibration mode and a second vibration mode, the second vibration modes being sensitive to Coriolis forces, wherein the second vibration mode is offset from the first vibration mode by 45°;

each of the first and second gyroscopes having a plurality of sensor elements mounted on the resonator to sense the first and second vibration modes; and wherein an excitation signal is alternately used to drive the first vibration mode and to drive an excitation of the second vibration mode over a period of time;

wherein the first and second gyroscopes are mutually orthogonal;

an additional gyroscope having its sensitive axis located at an angle that is not equal to 90 degrees with the first and second gyroscopes, wherein projections from an output the additional gyroscope are used as substitutes for outputs of the first and second gyroscopes during their transition processes, wherein:

an orientation of the sensitive axes of each of the first, second and third gyroscopes rotates by 180 degrees when comparing an orientation of the sensitive axis when the first vibration mode is driven vs. when the second vibration mode is driven; and wherein a microprocessor is configured so that a sign of a zero-bias output of the CVG does not change when the excitation of the first vibration mode changes to the excitation of the second vibration mode, wherein the microprocessor configures the first and second gyroscopes to have a time interval of the transition for the first gyroscope to be the same as a time interval of the transition of the second gyroscope, wherein bias errors of the first gyroscope are eliminated over an entire range of θ representing angular orientation of a vibration axis of the first vibration mode relative to an axis for excitation of a first electrode of the first gyroscope, and wherein the microprocessor is configured so that scale factors of the first gyroscope when exciting the first and second vibration modes are calibrated to be equivalent.

* * * * *